(No Model.)  2 Sheets—Sheet 1.

H. C. KIRK & J. T. BRAYTON.
BALANCED THERMOMETER.

No. 269,796.  Patented Dec. 26, 1882.

WITNESSES:
Jas. F. Duhamel
Walter S. Dodge

INVENTORS:
Hyland C. Kirk,
James T. Brayton,
by Dodge Son
Attys.

(No Model.) 2 Sheets—Sheet 2.
H. C. KIRK & J. T. BRAYTON.
BALANCED THERMOMETER.
No. 269,796. Patented Dec. 26, 1882.
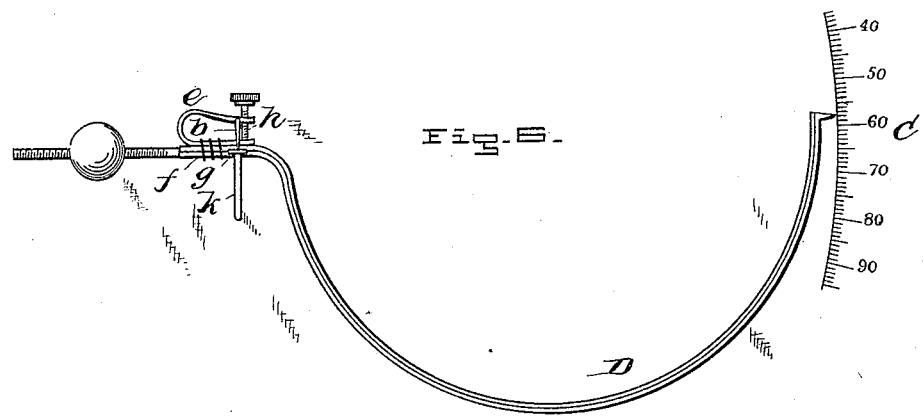
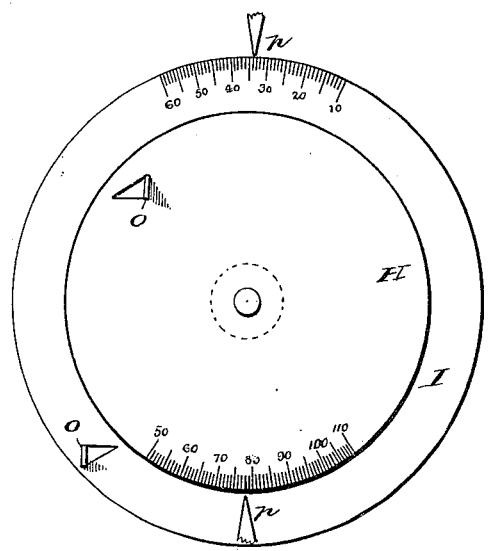
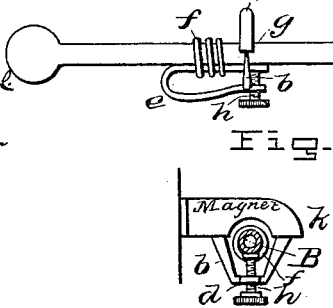
WITNESSES: INVENTORS:
Jas. F. DuHamel Hyland C. Kirk,
Walter S. Dodge James T. Brayton,
by Dodge & Son,
Attys.

UNITED STATES PATENT OFFICE.

HYLAND C. KIRK AND JAMES T. BRAYTON, OF PHELPS, NEW YORK.

BALANCED THERMOMETER.

SPECIFICATION forming part of Letters Patent No. 269,796, dated December 26, 1882.

Application filed August 25, 1882. (No model.)

*To all whom it may concern:*

Be it known that we, HYLAND C. KIRK and JAMES T. BRAYTON, of Phelps, in the county of Ontario and State of New York, have invented certain Improvements in Thermometers, of which the following is a specification.

Our invention relates to thermometers, and is primarily designed to enable the same to be read from a distance.

The invention consists in balancing the tube, or, in the case of a bimetallic bar being used, in balancing said bar, in such manner that at a given temperature the tube or bar shall stand at a given point, but as the temperature rises or falls, causing a corresponding expansion or contraction of the fluid or of the bar, the tube or bar shall fall or rise, and moving past a graduated scale or segment indicate the temperature.

The invention further consists in means for automatically recording the maximum and minimum temperature, in means for adjusting the point of suspension, both with reference to the center of gravity and with reference to the ends of the tube, and in various other features and details hereinafter pointed out and explained.

Figure 1:
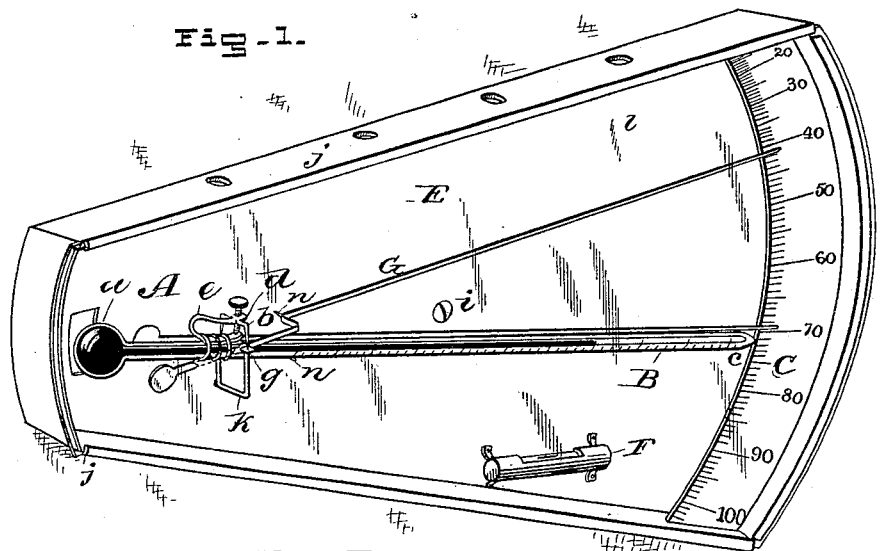
Figure 2:
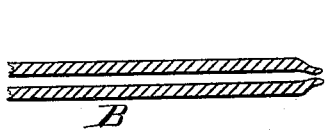
Figure 3:
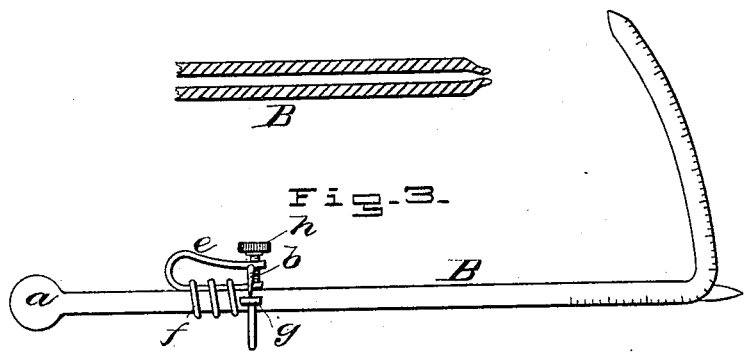
Figure 4:
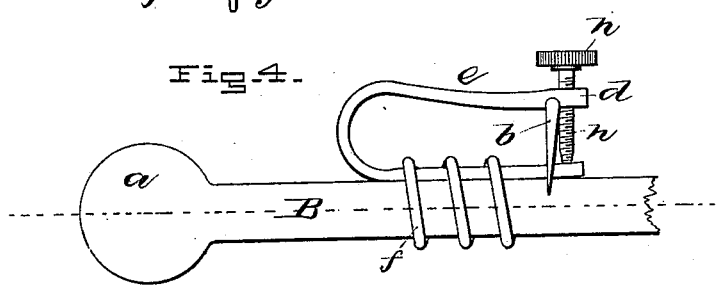
Figure 5:
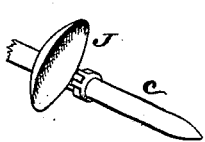

In the accompanying drawings, Figure 1 represents a perspective view of our improved thermometer; Fig. 2, an enlarged view, showing the open-ended tube which we employ in some cases; Fig. 3, a side view of the tube and its fittings, the outer end of the tube being bent upward; Fig. 4, an enlarged side view of the adjusting device; Fig. 5, a perspective view of a tube, or the outer end of a tube having a mirror or reflector applied to it to receive rays of light from another point and to direct them upon the scale at the end of the tube, for the purpose of showing its position at night; Fig. 6, a side elevation of a bimetallic bar adapted to be substituted for the tube; Fig. 7, a view illustrating the preferred form of recorder for marking the maximum and minimum temperature reached between certain times; Figs. 8 and 9, views showing a magnetized hanger.

As commonly constructed thermometers are of two general types, one consisting of a tube containing a fluid and placed upon or by the side of a graduated scale, and showing the temperature by the rise and fall of the fluid in the tube, and the other embracing in its construction a bimetallic bar, which, owing to the different expansibility and contractibility of the metals, causes the bar to bend and actuate a pointer or index. Under our plan, while making use of these same properties or qualities of the fluid or of the compound bar, whichever may be employed, we dispense with the separate indicator used with the latter, and suspend the tube from a point just above its center of gravity, in such manner that at a given temperature the point or end of the tube shall stand at a given point on the scale, marked to indicate such temperature, and that as the fluid expands or contracts or the bar lengthens or shortens the equilibrium shall be overcome and the arm or pointer caused to fall or rise and mark the proper degree on the scale. It is of course immaterial which end of the tube is made to serve as the pointer. We desire here to point out the important distinction between this plan and a certain proposed plan of balancing the tube of a barometer, which consists in placing the pivotal point slightly above the center of gravity, and causing the tube or bar to be suspended instead of simply balanced. If the pivots be placed at the center of gravity, any disturbance of the equilibrium of the tube or bar would cause the heavier end to drop down to a point directly below the pivot, and thus destroy the action of the device.

Referring to the drawings, A represents the instrument complete, consisting of a tube, B, preferably graduated, as shown, and having at one end a bulb, *a*, as usual, the tube containing mercury, alcohol, or other suitable fluid, and suspended from pivots *b* slightly above the center of gravity, as more clearly shown in Fig. 4, and a fixed scale, C, curved concentrically with the pivots or bearings *b*, so that the outer end or long arm, *c*, of tube B, moving by the scale and acting as a pointer or index, may be always at a uniform distance therefrom. Instead of tube B, a bimetallic bar, D, may be employed, the bar being curved so that the unequal expansion and contraction of its two plates or leaves shall cause the outer free end to move inward or outward, toward or away from the pivots *b*, thereby destroying the equilibrium and causing the bar to rise or fall in the same manner precisely as the tube B. The pivots consist of two fine-pointed arms formed upon a yoke, d, which straddles the tube or bar, and is formed upon the upper branch of a hanger or bent arm, e, the lower branch or arm of which has the tube or bar attached to and suspended from it by a coil or spiral, f, of wire. The points b rest upon small plates g, which are preferably very slightly indented, this form of pivot giving the least possible friction, and enabling the tube or bar to move with the slightest variation of temperature. The nearer the pivots are placed to the center of gravity the greater will be the movement of the tube, and vice versa; and as it is desirable to adapt the instrument to different scales we provide means for varying or adjusting the point of suspension relatively to the center of gravity, it being of course understood that the equilibrium is established by sliding the hanger e, and with it the pivots b, toward one or the other end of the tube, as required, in the first adjustment of the instrument, after which the position of the pivots relatively to the ends of the tube or bar remains fixed. The spiral or coil f possesses sufficient elasticity to hold the hanger at any desired point on the tube or bar, and yet to permit the adjustment along the same by the application of slight force.

In Fig. 4 the adjusting device is more clearly shown, and will be seen to consist simply of a screw, h, passing through a threaded hole in the upper arm of hanger e, and bearing at its point or lower end upon the lower arm of the hanger, the upper arm being made elastic to permit it to spring, as required, to adapt itself to the adjustment of the screw.

In the event of the tube being a perfect one, properly filled and sealed, the mercury or fluid will be found to remain in the portion nearest the bulb, even though the tube be moved to a vertical position, with the bulb uppermost, provided the movement be a gradual one, without jar or shock. Hence the ordinary form of tube may be employed, if selected with care; but to avoid possible trouble from this cause the end of the tube may be left open, as in Fig. 2, and the atmospheric pressure utilized to prevent the fluid from flowing down to the end of the tube when the latter is tipped, the graduations being made of course to allow for or in accordance with the difference due to this pressure. The end of the tube may be bent upward, as in Fig. 3, or the whole tube made in a curved form. The tube or bar is mounted within a sector-shaped case, E, the bearing-plates g being formed upon the arms of a bracket, k, which is fast to the inner wall of said case, as shown in Fig. 1.

In order that the case may be readily and accurately adjusted, to bring the scale C to its proper position, it is provided with a central fastening or supporting screw, i, upon which it may be tipped, as required. The case being secured by the screw with sufficient firmness to prevent its tipping of its own weight, and being brought approximately near its proper adjustment, the tube or bar is mounted upon its pivots and allowed to come to rest. Then, noting the temperature indicated by the fluid on the scale on the tube, the case is turned carefully until the tube or pointer marks the correct point on the scale C. Instead, however, of this plan, the case may be furnished with a plummet or with a spirit-level, F, which shall show by the ordinary action of such device when the case is in proper position. The case is formed with lips or flanges j to retain a glass cover or face-plate, l, which may be readily withdrawn, when desired, to permit the tube to be removed for use in liquids or elsewhere; and holes or openings m are made in the case to admit air to its interior and to cause the temperature within to be the same as that outside.

It is desirable in many cases to record automatically the maximum and minimum temperature for stated periods of time, and for this purpose we use two paper disks, H I, mounted upon a pivot concentric with the pivots b and separated by a washer, as indicated by dotted lines, the disks being graduated and provided with outwardly-turned lips or tongues o, which are struck and moved past fixed pointers p by the tube or bar. This plan is simple, cheap, and efficient. In some cases, however, delicately-balanced needles or pointers G may be mounted upon pivots concentric with the pivots or points b, and provided respectively with arms n, one projecting over and the other beneath the tube, so that as the latter rises it shall elevate one needle and as it falls depress the other. The needles, being accurately balanced, will naturally remain at the extreme point of movement reached; but in order to give greater certainty in this particular the needles are magnetized and the scale is made of soft iron, so that the attractive force of the magnetized needles tends to retain them where adjusted. Because, however, of the magnetic disturbances which are liable to occur with different atmospheric conditions, and to affect the needles, and particularly because of the trouble likely to occur when the bimetallic bar is employed, we prefer to use the disks H and I.

It is desirable that the device should be capable of showing the markings at night or in the dark. Hence we provide the arm c with a concave mirror or reflector, J, adapted to collect the rays from an outside light provided for the purpose, and to direct them upon the scale at the point of the indicator or tube. The scale, the end of the tube or pointer, or the reflector may, if desired, be coated with luminous paint for the same purpose.

A threaded nut may be used on the short arm of the bimetallic bar, when the latter is employed, to balance the same.

The tube or bar may, if desired, be suspended below the hanger-frame or bracket by making the latter of magnetized steel and the bearing or pivotal points b of soft iron, in which case the latter would be knife-edged and made adjustable by a screw, in the same manner substantially as above.

Having thus described our invention, what we claim is—

1. As a new article of manufacture, a thermometer having a balanced fluid tube or bar pivoted or suspended from a point above the center of gravity, one end of said tube or bar indicating on a scale the temperature, substantially as shown and described.

2. In a thermometer, the combination of a fluid-tube provided with an index at one end, which end may be open or closed, and with a bulb at the other end, and pivoted or suspended from a point above its center of gravity, and a fixed graduated scale at the pointed end of the tube.

3. The herein-described method of adjusting a balanced thermometer to scales having different graduations, which consists in varying the elevation of its pivots above the center of gravity.

4. In combination with a balanced thermometer, substantially such as shown and described, a case in which said thermometer is balanced, containing a fixed scale, and mounted upon a pivot, whereby it may be rotated to adjust the scale to proper position, as explained.

5. In combination with supports $g$, a hanger, $e$, provided with points $b$, and secured to and carrying the pointer tube or bar by means of spiral coil $f$, substantially as shown and described.

6. In combination with the indicator tube or bar, and a bracket or support, the bent arm or hanger $e$, provided with arms or points $b$ and adjusting-screw $i$, substantially as and for the purpose set forth.

7. In a balanced thermometer, substantially such as shown and described, a graduated thermometer-tube adapted to be removed from its pivots and used independently.

HYLAND C. KIRK.
JAMES T. BRAYTON.

Witnesses:
LYSANDER REDFIELD,
C. L. SILLECK.